(12) United States Patent
Pineau et al.

(10) Patent No.: US 11,993,714 B2
(45) Date of Patent: *May 28, 2024

(54) BLOCK COPOLYMER EXHIBITING IMPROVED ABRASION RESISTANCE AND IMPROVED TEAR RESISTANCE

(71) Applicant: Arkema France, Colombes (FR)

(72) Inventors: Quentin P. Pineau, Evreux (FR); Philippe Denis H. Blondel, Bernay (FR); Jean-Jacques Flat, Goupilliers (FR)

(73) Assignee: ARKEMA FRANCE, Colombes (FR)

( * ) Notice: Subject to any disclaimer, the term of this patent is extended or adjusted under 35 U.S.C. 154(b) by 307 days.

This patent is subject to a terminal disclaimer.

(21) Appl. No.: 16/763,567

(22) PCT Filed: Nov. 16, 2018

(86) PCT No.: PCT/FR2018/052870
§ 371 (c)(1),
(2) Date: May 13, 2020

(87) PCT Pub. No.: WO2019/097179
PCT Pub. Date: May 23, 2019

(65) Prior Publication Data
US 2020/0385574 A1 Dec. 10, 2020

(30) Foreign Application Priority Data
Nov. 17, 2017 (FR) ...................................... 17.60880

(51) Int. Cl.
*C08L 77/12* (2006.01)
*C08F 293/00* (2006.01)
*C08G 69/48* (2006.01)

(52) U.S. Cl.
CPC ............ *C08L 77/12* (2013.01); *C08F 293/00* (2013.01); *C08G 69/48* (2013.01)

(58) Field of Classification Search
CPC .............................. C08L 77/12; C08L 2666/14
See application file for complete search history.

(56) References Cited

U.S. PATENT DOCUMENTS 4,772,649 A 9/1988 Andrews et al.
2005/0261448 A1* 11/2005 Takahashi ............ H05K 1/0346
528/196
2009/0169882 A1 7/2009 Jandris et al.
2015/0210852 A1 7/2015 Satou et al.
2015/0210853 A1 7/2015 Fujisawa et al.
2015/0021873 A1 8/2015 Mitadera et al.
2015/0218731 A1 8/2015 Mitadera et al.
2016/0376483 A1* 12/2016 Eustache ................ C08G 81/00
428/212
2017/0313853 A1 11/2017 Dunn et al.

FOREIGN PATENT DOCUMENTS

| CN | 101970536 A | 2/2011 |
| CN | 104583321 A | 4/2015 |
| CN | 104583473 A | 4/2015 |
| CN | 105566639 A | 5/2016 |
| JP | S63-179961 A | 7/1988 |
| JP | 3452563 B2 | 9/2003 |
| WO | 2009/054312 A1 | 3/2011 |
| WO | 2014/027648 A1 | 2/2014 |
| WO | 2014/027651 A1 | 2/2014 |

OTHER PUBLICATIONS

Office Action (The First Office Action) dated Mar. 25, 2022 by the China National Intellectual Property Administration in corresponding Chinese Patent Application No. 201880074614.0, and an English Translation of the Office Action. (25 pages).
Office Action (Notice of Reasons for Rejection) dated Oct. 25, 2022, by the Japanese Patent Office in corresponding Japanese Patent Application No. 2020-527017, and an English Translation of the Office Action. (7 pages).

* cited by examiner

*Primary Examiner* — Ana L. Woodward
(74) *Attorney, Agent, or Firm* — Boone IP Law

(57) ABSTRACT

The invention relates to a copolymer containing rigid polyamide PA blocks and flexible blocks, characterized in that it includes at least one carboxylic acid chain end blocked with a polycarbodiimide, said copolymer according to the invention being in noncrosslinked linear form. The invention also relates to the use of a polycarbodiimide in a process for manufacturing a copolymer containing rigid polyamide PA blocks and flexible blocks, including at least one carboxylic acid chain end, for improving the extrudability of the copolymer, the drawability of the copolymer, the abrasion resistance, the tear strength and the durability of the copolymer, without increasing its dispersity.

10 Claims, 3 Drawing Sheets

Elongational rheology

Copo 3 according to the invention (top curve)
compared to PEBA 3 (bottom curve)

Elongational rheology

Copo 4 according to the invention (top curve)
compared to PEBA 4 (bottom)

Tensil curve according to ISO 527 1A at 23°C

Copo 1 according to the invention (top curve) compared to PEBA 1 (bottom curve)

BLOCK COPOLYMER EXHIBITING IMPROVED ABRASION RESISTANCE AND IMPROVED TEAR RESISTANCE

This application claims benefit, under U.S.C. § 119 or § 365 of PCT Application Number PCT/FR2018/052870, filed Nov. 16, 2018, and French Patent Applications Number FR 17.60880, filed Nov. 17, 2017, these documents being incorporated herein by reference.

FIELD OF THE INVENTION

The present invention relates to a novel copolymer containing rigid polyamide PA blocks and flexible blocks, such as polyether PE or polyester PES, for manufacturing materials that are, simultaneously, abrasion-resistant and tear-resistant, and more durable by virtue of limiting the residual deformation, while at the same time being readily recyclable.

The present invention also relates to a process for manufacturing such a composition and to the use thereof notably in the sports industry, in particular that of shoes, notably for manufacturing soles and most particularly sports shoe soles.

TECHNICAL BACKGROUND

In the last decade, copolymers containing polyamide PA blocks and polyether PE blocks (abbreviated as PEBA copolymer in the present description), notably those sold by the company Arkema under the brand name Pebax®, have gradually asserted themselves in the field of high-quality shoes, in particular sports shoes, by virtue of their mechanical properties and notably their exceptional elastic return property. Specifically, PEBAs may be advantageously used in sports shoes as soles of "semi-rigid" type (football, baseball, etc.) or flexible type (jogging) making it possible directly to produce the insole (shock absorption) and/or the outer sole (abrasion resistance-rigidity).

Unfortunately, the abrasion resistance, expressed by the loss of mass in milligrams (according to the standard ISO 9352:2012) and the tear strength, expressed in kN/m (according to the standard ISO 34-1:2015), of the PEBA-based substrates of the systems of the prior art, is far from being optimal. Thus, with some PEBA substrates with a hardness from 25 to 55 Shore D on average (for example Pebax® 2533), a tear strength of 41 kN/m, measured according to the standard ISO 34-1:2015, is obtained at best. However, for certain applications, shoe manufacturers impose a tear strength of at least 45 kN/m, preferably of at least 50 kN/m, or even of at least 60 kN/m. For other PEBA substrates with a hardness from 25 to 55 Shore D on average, for example Pebax® 35R53, the abrasion is such that the loss of mass measured according to the standard ISO 9352:2012 is greater than 55 mg.

SUMMARY OF THE INVENTION

The aim of the present invention is thus to provide a block copolymer with improved abrasion resistance and tear strength properties.

The aim of the present invention is also to provide a copolymer with a lower residual tensile strain according to the standard ISO 527-1A: 2012, i.e. with a lower percentage of residual strain, to allow better durability of the polymer material.

The aim of the present invention is also to provide materials that are both durable and recyclable, these two requirements generally being conflicting in the field of thermoplastic elastomer materials.

The Applicant has now developed a novel type of block copolymer, which has improved abrasion resistance, improved tear strength and improved durability, while at the same time conserving excellent recyclability properties.

DESCRIPTION OF EMBODIMENTS OF THE INVENTION

Figure 1:
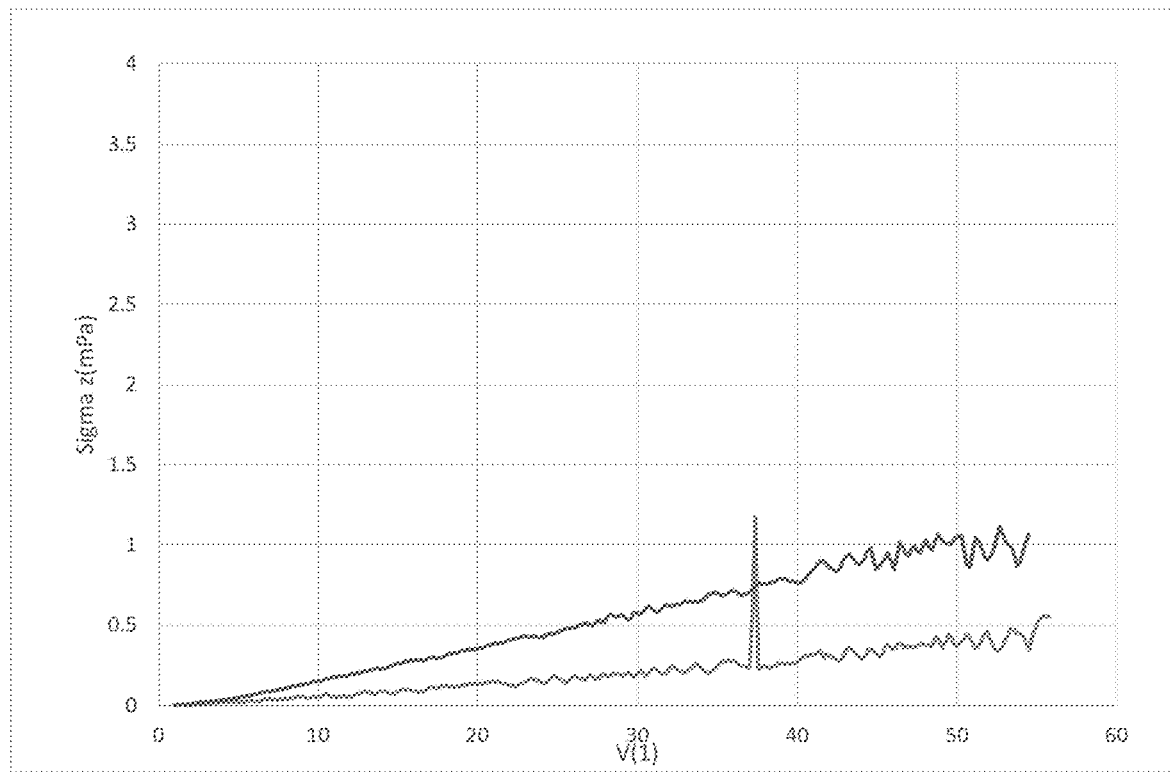
FIG. 1 shows a curve representing elongation stress on the y-axis as a function of the elongation factor on the x-axis.

In the present description, it is pointed out that when reference is made to ranges, expressions of the type "ranging from . . . to . . . " or "including/comprising from . . . to . . . " include the limits of the range. Conversely, expressions of the type "between . . . and . . . " exclude the limits of the range.

Unless otherwise mentioned, the percentages expressed are mass percentages. Unless otherwise mentioned, the parameters to which reference is made are measured at atmospheric pressure and at room temperature (20-25° C., generally 23° C.).

The invention is now described in detail and in a non-limiting manner in the description that follows.

One subject of the invention is thus a copolymer containing rigid polyamide PA blocks and flexible blocks, characterized in that it includes at least one carboxylic acid chain end blocked with a polycarbodiimide.

The copolymer containing rigid polyamide PA blocks and flexible blocks thus defined according to the invention falls among the thermoplastic elastomer polymers. The term "thermoplastic elastomer polymer", abbreviated as "TPE", denotes a polymer which constitutes a polyphasic material having at least two transitions, namely a first transition at a temperature T1 (in general this is the glass transition temperature) and a second transition at a temperature T2 above T1 (in general this is the melting point). At a temperature below T1, the material is rigid, between T1 and T2 it has elastic behavior, and above T2 it is molten. Such a polymer combines the elastic behavior of materials of rubber type with the transformability of thermoplastics.

A polyamide-based thermoplastic elastomer (TPE-A) for the purposes of the invention, such as a PEBA, is a block copolymer comprising an alternating sequence of rigid or hard blocks (HB) and flexible or soft blocks (SB), according to the following general formula:

and in which:

HB or Hard Block or rigid block: represents a block comprising polyamide (homopolyamide or copolyamide) or a mixture of blocks comprising polyamide (homopolyamide or copolyamide), abbreviated independently hereinbelow as PA or HB block;

SB or Soft Block or flexible block: represents a block based on polyether (PE block), polyester (PES block), polydimethylsiloxane (PDMS block), polyolefin (PO block), polycarbonate (PC block) and/or any other polymer with a low glass transition temperature, or mixtures thereof in the form of alternating, statistical or block copolymers. Preferably, SB is a block totally or partly based on polyether including alkylene oxide units.

n represents the number of repeating units in the unit -HB-SB- of said copolymer. n is within the range extending from 1 to 60, preferably from 5 to 30 or better still from 6 to 20.

For the purposes of the invention, the expression "low glass transition temperature" for a polymer included in the composition of an SB means a glass transition temperature Tg below 15° C., preferably below 0° C., preferably below −15° C., more preferably below −30° C. By way of example, said soft block may be based on PEG with a number-average molar mass equal to 1500 g/mol and a Tg of the order of −35° C. Said glass transition temperature Tg may also be below −50° C., notably in the case where said soft block is based on PTMG.

Copolyether block amides, also known as copolymers containing polyether blocks and polyamide blocks, abbreviated as "PEBA", result from the polycondensation of polyamide blocks bearing reactive ends with polyether blocks bearing reactive ends, such as, inter alia:
1) polyamide blocks bearing diamine chain ends with polyoxyalkylene blocks bearing dicarboxylic chain ends;
2) polyamide blocks bearing dicarboxylic chain ends with polyoxyalkylene blocks bearing diamine chain ends, obtained by cyanoethylation and hydrogenation of α,ω-dihydroxylated aliphatic polyoxyalkylene blocks, known as polyetherdiols;
3) polyamide blocks bearing dicarboxylic chain ends with polyetherdiols, the products obtained being, in this particular case, polyetheresteramides.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The number-average molar mass Mn of the polyamide blocks is between 400 and 20 000 g/mol and preferably between 500 and 10 000 g/mol.

The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic or aromatic diamine, in particular those containing from 2 to 20 carbon atoms, preferably those containing from 6 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid, but also dimerized fatty acids.

As examples of diamines, mention may be made of tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM) and 2-2-bis-(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

As regards the polyamide rigid block, the standard NF EN ISO 1874-1: 2011 defines a nomenclature for polyamides. In the present description, the term "monomer" should be taken as meaning "repeating unit". The case where a repeating unit of the polyamide consists of the combination of a diacid with a diamine is particular. It is considered that it is the combination of a diamine and of a diacid, i.e. the "diamine diacid", also called "XY", pair, in equimolar amount, which corresponds to the monomer. This is explained by the fact that, individually, the diacid or the diamine is only a structural unit, which is not enough by itself to polymerize.

Examples thereof are the blocks PA412, PA414, PA418, PA610, PA612, PA614, PA618, PA912, PA1010, PA1012, PA1014 and PA1018.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of α,ω-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide-11, polyamide-12 or polyamide-6.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:
of the linear aliphatic or aromatic diamine(s) containing X carbon atoms;
of the dicarboxylic acid(s) containing Y carbon atoms; and
of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y);
said comonomer(s) {Z} being introduced in a weight proportion ranging up to 50%, preferably up to 20%, even more advantageously up to 10% relative to the total amount of polyamide-precursor monomers;
in the presence of a chain limiter chosen from dicarboxylic acids.

Advantageously, the dicarboxylic acid containing Y carbon atoms is used as chain limiter, which is introduced in excess relative to the stoichiometry of the diamine(s).

According to one variant of this third type, the polyamide blocks result from the condensation of at least two α,ω-aminocarboxylic acids or from at least two lactams containing from 6 to 12 carbon atoms or from one lactam and one aminocarboxylic acid not having the same number of carbon atoms, in the optional presence of a chain limiter. As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. An example of a cycloaliphatic diacid that may be mentioned is 1,4-cyclohexyldicarboxylic acid. As examples of aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol® by the company Unichema, or under the brand name Empol® by the company Henkel) and α,ω-diacid polyoxyalkylenes. As examples of aromatic diacids, mention may be made of terephthalic acid (T) and isophthalic acid (I). As examples of cycloaliphatic diamines, mention may be made of bis(4-aminocyclohexyl)methane (BACM), bis(3-methyl-4-aminocyclohexyl)methane (BMACM), 2-2-bis(3-methyl-4-aminocyclohexyl)propane (BMACP) and para-aminodicyclohexylmethane (PACM) isomers. The other diamines commonly used may be isophoronediamine (IPDA), 2,6-bis(aminomethyl)norbornane (BAMN) and piperazine.

In the case where the PA blocks of the PEBA according to the invention comprise at least two different monomers, called "comonomers", i.e. at least one monomer and at least one comonomer (monomer other than the first monomer), they comprise a copolymer, such as a copolyamide, abbreviated as CoPA.

As examples of polyamide blocks of the third type, mention may be made of the following:
  66/6 in which 66 denotes hexamethylenediamine units condensed with adipic acid. 6 denotes units resulting from the condensation of caprolactam.
  66/610/11/12 in which 66 denotes hexamethylenediamine condensed with adipic acid. 610 denotes hexamethylenediamine condensed with sebacic acid. 11 denotes units resulting from the condensation of aminoundecanoic acid. 12 denotes units resulting from the condensation of lauryllactam.

The mass Mn of the flexible blocks is between 100 and 6000 g/mol and preferably between 200 and 3000 g/mol.

Preferably, the polymer comprises from 1% to 80% by mass of flexible blocks and from 20% to 99% by mass of polyamide blocks, preferably from 4% to 80% by mass of flexible blocks and from 20% to 96% by mass of polyamide blocks.

According to a preferred embodiment, the rigid polyamide block, in the copolymer containing rigid PA blocks and flexible blocks according to the invention, comprises at least one of the following polyamide units: 11, 12, 6, 610, 612, 1010, 1012, and mixtures or copolyamides thereof.

The polyether blocks PE are formed from alkylene oxide units. These units may be, for example, ethylene oxide units, propylene oxide units or tetrahydrofuran (which leads to polytetramethylene glycol sequences). Use is thus made of PEG (polyethylene glycol) blocks, i.e. blocks formed from ethylene oxide units, PPG (propylene glycol) blocks, i.e. blocks formed from propylene oxide units, PO3G (polytrimethylene glycol) blocks, i.e. blocks formed from polytrimethylene glycol ether units (such copolymers with polytrimethylene ether blocks are described in patent U.S. Pat. No. 6,590,065), and PTMG blocks, i.e. blocks formed from tetramethylene glycol units, also known as polytetrahydrofuran. The PEBA copolymers may comprise in their chain several types of polyethers, the copolyethers possibly being in block or statistical form.

Use may also be made of blocks obtained by oxyethylation of bisphenols, for instance bisphenol A. The latter products are described in patent EP 613 919.

The polyether blocks may also be formed from ethoxylated primary amines. As examples of ethoxylated primary amines, mention may be made of the products of formula:

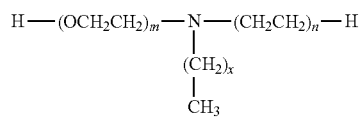

in which m and n are between 1 and 20 and x is between 8 and 18. These products are commercially available under the brand name Noramox® from the company CECA and under the brand name Genamin® from the company Clariant.

The flexible polyether blocks may comprise polyoxyalkylene blocks bearing $NH_2$ chain ends, such blocks being able to be obtained by cyanoacetylation of α,ω-dihydroxylated aliphatic polyoxyalkylene blocks referred to as polyetherdiols. More particularly, use may be made of the Jeffamine products (for example Jeffamine® D400, D2000, ED 2003, XTJ 542, which are commercial products from the company Huntsman, also described in patents JP2004346274, JP2004352794 and EP1482011).

The polyether diol blocks are either used in unmodified form and copolycondensed with polyamide blocks bearing carboxylic end groups, or they are aminated to be converted into polyetherdiamines and condensed with polyamide blocks bearing carboxylic end groups. The general method for the two-step preparation of PEBA copolymers containing ester bonds between the PA blocks and the PE blocks is known and is described, for example, in French patent FR2846332. The general method for the preparation of PEBA copolymers of the invention containing amide bonds between the PA blocks and the PE blocks is known and is described, for example, in European patent EP1482011. The polyether blocks may also be mixed with polyamide precursors and a chain-limiting diacid to make polymers containing polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Kellaflex® products sold by DSM or to any other PEBA from other suppliers.

Advantageously, the PEBA copolymers contain PA blocks as PA 6, as PA 11, as PA 12, as PA 612, as PA 66/6, as PA 1010 and/or as PA 614, preferably PA 11 and/or PA 12 blocks; and PE blocks as PTMG, as PPG and/or as PO3G. The PEBAs based on PE blocks predominantly consisting of PEG are to be categorized in the range of hydrophilic PEBAs. The PEBAs based on PE blocks predominantly consisting of PTMG are to be categorized in the range of hydrophobic PEBAs.

Advantageously, said PEBA used in the composition according to the invention is at least partially obtained from biobased raw materials.

The term "raw materials of renewable origin" or "biobased raw materials" means materials which comprise biobased carbon or carbon of renewable origin. Specifically, unlike materials derived from fossil materials, materials composed of renewable starting materials contain $^{14}C$. The "content of carbon of renewable origin" or "content of biobased carbon" is determined by application of the standards ASTM D 6866 (ASTM D 6866-06) and ASTM D 7026 (ASTM D 7026-04). By way of example, the PEBAs based on polyamide 11 at least partly originate from biobased raw materials and have a content of biobased carbon of at least 1%, which corresponds to a $^{12}C/^{14}C$ isotope ratio of at least $1.2 \times 10^{-14}$. Preferably, the PEBAs according to the invention comprise at least 50% by mass of biobased carbon relative to the total mass of carbon, which corresponds to a $^{12}C/^{14}C$ isotope ratio of at least $0.6 \times 10^{-12}$. This content is advantageously higher, notably up to 100%, which corresponds to a $^{12}C/^{14}C$ isotope ratio of $1.2 \times 10^{-12}$, in the case, for example, of PEBA containing PA 11 blocks and PE blocks comprising PO3G, PTMG and/or PPG derived from starting materials of renewable origin.

The polyester blocks PES are usually manufactured by polycondensation between a dicarboxylic acid and a diol. Suitable carboxylic acids comprise those mentioned above used for forming the polyamide blocks, with the exception of terephthalic acid and isophthalic acid. Suitable diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol.

The term "polyesters" also means poly(caprolactone) and PESs based on fatty acid dimers, in particular the products of the Priplast® range from the company Croda or Uniqema.

It is also possible to envisage a PES block of alternating, statistical or block "copolyester" type, containing a sequence of at least two types of PES mentioned above.

For the purposes of the invention, the term polysiloxane block (abbreviated hereinbelow as PSi) means any organosilicon polymer or oligomer of linear or cyclic, branched or crosslinked structure, obtained by polymerization of functionalized silanes, and consisting essentially of a repetition of main units in which silicon atoms are linked together via oxygen atoms (siloxane bond —Si—O—Si—), optionally substituted hydrocarbon-based radicals being directly linked via a carbon atom to said silicon atoms. The most common hydrocarbon-based radicals are alkyl radicals, notably of C1-C10 and in particular methyl, fluoroalkyl radicals, aryl radicals and in particular phenyl, and alkenyl radicals and in particular vinyl; other types of radicals that may be bonded, either directly or via a hydrocarbon-based radical, to the siloxane chain are notably hydrogen, halogens and in particular chlorine, bromine or fluorine, thiols, alkoxy radicals, polyoxyalkylene (or polyether) radicals and in particular polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list obviously not being in any way limiting ("organomodified" silicones).

Preferably, said polysiloxane blocks comprise polydimethylsiloxane (abbreviated hereinbelow as PDMS blocks), polymethylphenylsiloxane and/or polyvinylsiloxane.

For the purposes of the invention, the term polyolefin block (abbreviated hereinbelow as PO block) means any polymer comprising an α-olefin as monomer, i.e. homopolymers of an olefin or copolymers of at least one α-olefin and of at least one other copolymerizable monomer, the α-olefin advantageously containing from 2 to 30 carbon atoms.

As examples of α-olefins, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins may be used alone or as a mixture of two or of more than two.

Examples that may be mentioned include:
ethylene homopolymers and copolymers, in particular low-density polyethylene (LDPE), high-density polyethylene (HDPE), linear low-density polyethylene (LLDPE), very-low-density polyethylene (VLDPE) and polyethylene obtained by metallocene catalysis,
propylene homopolymers and copolymers,
essentially amorphous or atactic poly-α-olefins (APAO),
ethylene/α-olefin copolymers such as ethylene/propylene, EPR (ethylene-propylene-rubber) elastomers and EPDM (ethylene-propylene-diene) elastomers, and mixtures of polyethylene with an EPR or an EPDM, styrene/ethylene-butene/styrene (SEBS), styrene/butadiene/styrene (SBS), styrene/isoprene/styrene (SIS) and styrene/ethylene-propylene/styrene (SEPS) block copolymers;
copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to an advantageous embodiment of the invention, said at least one polyolefin block comprises polyisobutylene and/or polybutadiene.

According to a particularly advantageous embodiment, the block copolymer according to the invention includes at least one flexible polyolefin block (PO block) and at least one hard hydrophilic block (abbreviated hereinbelow as hHB) comprising both polyamide and polyether, such as a polyetheramide block, a polyetheresteramide block and/or a polyetheramideimide block, etc. Said PO block preferably comprises a polyolefin including acid, alcohol or amine end groups. Preferably, the PO block is obtained by thermal degradation of high molecular weight polyolefins to form polyolefins of lower mass and functionalized (reference method: Japanese Kokai Publication Hei-03-62804). As regards the hHB block, it may also comprise at least one polymer chosen from: cationic polymers of quaternary amine type and/or phosphorus derivatives; and/or anionic polymers, of modified diacid type, including a sulfonate group and which are capable of reacting with a polyol. The addition of organic salt may then be envisaged in the preparation of the hHB block or during the reaction between the PO block and the hHB block. U.S. Pat. No. 6,552,131 describes the synthesis and the various possible structures for the copolymer containing PO blocks and hHB blocks, it being possible, needless to say, for the latter to be envisaged in the process according to the invention.

For the purposes of the invention, the term polycarbonate block (abbreviated hereinbelow as PC block) more particularly means any aliphatic polycarbonate. Aliphatic polycarbonates are described, for example, in DE2546534 and JP1009225. Such polycarbonate homopolymers or copolymers are also described in US 471203. Patent applications WO 92/22600 and WO 95/12629 describe copolymers comprising polycarbonate blocks and also the processes for synthesizing same. The blocks (and the synthesis thereof) described in said documents may be entirely envisaged for the synthesis of a PC block copolymer according to the invention. Preferably, the polycarbonate blocks of the copolymer according to the invention have the formula:

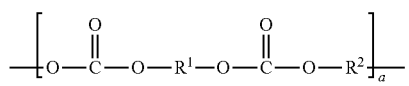

in which a is an integer from 2 to 300; R1 and R2, which may be identical or different, represent a straight or branched, aliphatic or alicyclic chain containing from 2 to 18 carbon atoms, or represent a polyoxyalkylene group, or represent a polyester group.

The polycarbonates in which R1 and R2 are chosen from hexylene, decylene, dodecylene, 1,4-cyclohexylene, 2,2-dimethyl-1,3-propylene, 2,5-dimethyl-2,5-hexylene or polyoxyethylene groups are preferred.

If the block copolymers described above generally comprise at least one rigid polyamide block and at least one flexible block, it is obvious that the present invention in fact covers all the copolymers comprising two, three, four (or even more) different blocks chosen from those described in the present description, provided that at least one of these blocks is a polyamide block.

Advantageously, the copolymer according to the invention comprises a block segmented copolymer comprising three different types of blocks (referred to as "triblock" in the present description of the invention), which result from the condensation of several of the blocks described above. Said triblock is preferably chosen from copolyetheresteramides and copolyetheramideurethanes in which:
the mass percentage of rigid polyamide block is greater than 10%;
the mass percentage of flexible blocks is greater than 20%;
relative to the total mass of triblock.

According to a preferred embodiment, the flexible block in the copolymer containing rigid PA blocks and flexible blocks according to the invention comprises (and preferably is) a polyether PE block, preferably chosen from PTMG, PPG, PO3G and/or PEG.

According to another advantageous embodiment, the flexible block in the copolymer containing rigid PA blocks and flexible blocks according to the invention comprises (and preferably is) a polyester PES block, chosen from polyester diols, poly(caprolactone) and polyesters based on fatty acid dimers.

Advantageously, in the copolymer according to the invention, the weight ratio of the PA blocks to the flexible blocks is within the range from 0.3 to 10, preferably from 0.3 to 6, preferably from 0.3 to 3, preferably from 0.3 to 2.

Polycarbodiimides that are suitable for the present invention are represented by the following general formula:

in which R is monovalent, R' is divalent, n is from 2 to 50, preferably from 2 to 45, preferably from 2 to 20 and preferably from 5 to 20.

R may be, for example, a C1-C20 alkyl or C3-C10 cycloalkyl or C1-C20 alkenyl group, and may be cyclic or branched, or may contain a C8-C16 aromatic nucleus, and may be substituted with functional groups.

R' may be a divalent group corresponding to all the foregoing, for example a C1-C20 alkylene, a C3-C10 cycloalkylene, etc. Examples of functional groups comprise, without being limited thereto, cyanato and isocyanato, halo, amido, carboxamido, amino, imido, imino, silyl, etc. These lists are intended solely for illustrative purposes and not for the purpose of limiting the scope of the present invention.

As examples of polycarbodiimides that may be used according to the present invention, mention may be made of repeated units of N,N'-dicyclohexylcarbodiimide, N,N'-diisopropylcarbodiimide, N,N'-diphenylcarbodiimide, N,N'-bis(2,6-diisopropylphenyl)carbodiimide, 4,4'-dicyclohexylmethanecarbodiimide, tetramethylxylylenecarbodiimide (aromatic carbodiimide), N,N-dimethylphenylcarbodiimide, N,N'-bis(2,6-diisopropylphenyl)carbodiimide, 2,2',6,6'-tetraisopropyldiphenylcarbodiimide (aromatic carbodiimide), aromatic homopolymer of 1,3,5-triisopropyl-2,4-diisocyanatobenzene, aromatic heteropolymer of 1,3,5-triisopropyl-2,4-diisocyanatobenzene and 2,6-diisopropylphenyl isocyanate, or combinations thereof.

Specific examples of R' comprise, without being limited thereto, divalent radicals derived from 2,6-diisopropylbenzene, naphthalene, 3,5-diethyltoluene, 4,4'-methylenebis(2,6-diethylenephenyl), 4,4'-methylenebis(2-ethyl-6-methylphenyl), 4,4'-methylenebis(2,6-diisopropylphenyl), 4,4'-methylenebis(2-ethyl-5-methylcyclohexyl), 2,4,6-triisopropylphenyl, n-hexane, cyclohexane, dicyclohexylmethane and methylcyclohexane, and analogs.

U.S. Pat. Nos. 5,130,360, 5,859,166, US 368493, U.S. Pat. No. 7,456,137, US 2007/0278452, US 2009/0176938, and in particular U.S. Pat. No. 5,360,888 describe more examples of polycarbodiimides.

Suitable polycarbodiimides may be obtained from commercially available sources such as the Stabaxol P series from Rhein Chemie, the Stabilizer series from Raschig, and others from Ziko or Teijin, for example.

Advantageously, the polycarbodiimide is chosen from a Stabilizer product, in particular Stabilizer® 9000 corresponding to poly(1,3,5-triisopropylphenylene-2,4-carbodiimide), a Stabaxol® product, notably a Stabaxol® P product, in particular Stabaxol® P100 or Stabaxol® P400, or a mixture thereof.

Preferably, the polycarbodiimide has a weight-average molecular mass of greater than 10 000 g/mol.

Advantageously, the weight-average molecular mass of the polycarbodiimide is within the range from 10 000 to 40 000 g/mol, preferably from 15 000 to 30 000 g/mol.

Preferably, the weight-average molecular mass of the polycarbodiimide used in the present invention is measured by gel permeation chromatography (GPC) in tetrahydrofuran (THF).

The weight content of the polycarbodiimide advantageously represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of the copolymer according to the invention.

According to an advantageous embodiment of the invention, said carboxylic acid of the copolymer according to the invention forms a urea bond by reaction with a carbodiimide of the polycarbodiimide.

One of the advantages of the block copolymer bearing a blocked acid chain end according to the invention is that it remains in noncrosslinked linear form, the dispersity Mw/Mn of the copolymer being less than 3. This is surprising insofar as, in the prior art, carbodiimides are rather used for increasing the viscosity of polyamides (see, for example, patent FR 3027907), notably by crosslinking them, and for improving their resistance to hydrolysis as described in U.S. Pat. No. 5,360,888.

A subject of the present invention is also the use, in a process for manufacturing a copolymer containing rigid polyamide PA blocks and flexible blocks, said copolymer including at least one carboxylic acid chain end, of a polycarbodiimide for improving the extrudability of the copolymer, the drawability of the copolymer, the abrasion resistance, the tear strength and the durability of said copolymer, without increasing its dispersity.

Preferably, for the use according to the invention, the polycarbodiimide has a weight-average molecular mass of greater than 10 000 g/mol, preferably within the range from 10 000 to 40 000 g/mol, preferably from 15 000 to 30 000 g/mol.

Advantageously, at least one carboxylic acid chain end of the copolymer is blocked with a urea function formed by reaction with the polycarbodiimide.

A subject of the present invention is also a copolymer-based composition according to the invention, characterized in that it comprises:
from 51% to 99.9% by weight of said copolymer,
from 0.1% to 49% by weight of at least one other component chosen from polyamides, functional polyolefins, copolyetheresters, thermoplastic polyurethanes (TPU), copolymers of ethylene and vinyl acetate, copolymers of ethylene and of acrylate, and copolymers of ethylene and of alkyl (meth)acrylate,
and/or
from 0.1% to 10% by weight of additives chosen from nucleating agents, fillers, notably mineral fillers, such as talc, reinforcing fibers, notably glass or carbon fibers, dyes, UV absorbers, antioxidants, notably phenolic or phosphorus-based or sulfur-based antioxidants, hindered-amine light stabilizers (HALS), and mixtures thereof,
relative to the total weight of the composition.

A subject of the present invention is also a process for manufacturing the copolymer according to the invention, comprising the mixing of the block copolymer as defined according to the invention and of polycarbodiimide as defined above so that at least one carboxylic acid chain end of the block copolymer reacts with the carbodiimide function of the polycarbodiimide, to advantageously form a urea function.

According to an advantageous embodiment of the process of the invention, the mixing is performed using a single-screw or twin-screw extruder in order to achieve intimate mixing of the copolymer and of the polycarbodiimide in the melt, and to allow the reaction between the acid function of the copolymer and the carbodiimide function of the polycarbodiimide. The mixing of the components may also be performed by adding the polycarbodiimide during the synthesis of the block copolymer. The copolymer according to the invention may also be manufactured by using a masterbatch comprising the block copolymer and the polycarbodiimide prepared as described previously, followed by diluting the masterbatch in the block copolymer during the step of implementation of the finished object.

A subject of the present invention is also a fashioned article, such as a fiber, fabric, film, sheet, rod, tube, injection-molded and/or extruded component, comprising a copolymer or a composition according to the invention.

Preferably, said article constitutes at least a part of one of the following articles, sports article, shoe component, sports shoe component, shoe sole, notably studs, ski component, notably ski boot or ski boot shell, sports tool such as ice skates, ski attachments, rackets, sports bats, boards, horseshoes, protective leggings, flippers, golf balls, leisure articles, DIY articles, road maintenance tool or equipment, protective equipment or article, such as helmet visors, goggles, goggle arms, motor vehicle part, car component such as dashboard, airbag, headlamp protector, rearview mirror, small part for off-road vehicles, tank, in particular for scooters, mopeds or motorbikes, industrial component, industrial additive, electrical, electronic, information technology, tablet computer, telephone or computer component, safety accessory, shop sign, lighting strip, information and publicity panel, presentation case, engraving, furnishing, shopfitting, decoration, contact ball, medical device, dental prosthesis, implant, ophthalmology article, hemodialysis machine membrane, optical fibers, art object, sculpture, photography camera lens, disposable photography camera lens, printing support, notably support for direct printing with UV inks, for photography table, window, sunroof, transmission belt, antistatic additive, waterproof breathable product or film, active molecule support, colorant, welding agent, decorative element, and/or polyamide additive, rail sole, pushchair component, wheel, handle, seat component, childhood car seat component, construction component, audio equipment, acoustic insulation and/or heat insulation component, component for absorbing impacts and/or vibrations, such as those generated by a means of transport, smooth-riding wheels such as a tire, textile, woven or nonwoven, wrapping, peristaltic belt, conveyor belt, synthetic skin and/or leather, and any article comprising a mixture of these articles.

EXAMPLES

The examples that follow illustrate the invention without limiting it. The standards used in the examples also correspond to those used more generally for characterizing the invention in the description or the claims.

Materials Used:
In the examples that follow:
PEBA 1: PA 12-PTMG (Mn: 600-2000)
PEBA 1 is a copolymer containing PA 12 blocks and PTMG blocks with respective number-average molecular masses (Mn) of 600-2000.
Copo 1: 98.5% PEBA 1+1.5% PCDI
PEBA 2: PA 12-PTMG (Mn: 850-2000)
PEBA 2 is a copolymer according to the invention, containing PA 12 blocks and
PTMG blocks with respective number-average molecular masses (Mn) of 850-2000.
Copo 2: 98% PEBA 2+2% PCDI
PEBA 3: PA 12-PTMG (Mn: 2000-1000)
PEBA 3 is a copolymer according to the invention, containing PA 12 blocks and
PTMG blocks with respective number-average molecular masses (Mn) of 2000-1000.
Copo 3: 98.5% PEBA 3+1.5% PCDI
PEBA 4: PA11-PTMG (600-1000)
PEBA 4 is a copolymer containing PA 11 blocks and PTMG blocks with respective number-average molecular masses (Mn) of 600-1000.
Copo 4: 98% PEBA 4+2% PCDI
PCDI: Polycarbodiimide used in the examples: Poly(1,3, 5-triisopropylphenylene-2,4-carbodiimide)

Example 1: Measurement of the Extrudability of the PEBA and Copo Materials

Table 1 below gives the results of the melt viscosity measurement eta* (in Pa·s) at 220° C., as a function of the angular frequency (rad/s) according to the standard ISO 6721-10:2015.

TABLE 1

| Angular frequency [1/s] | eta* - PEBA 1 [Pa · s] | eta* - Copo 1 [Pa · s] | eta* - PEBA 3 [Pa · s] | eta* - Copo 3 [Pa · s] | eta* - PEBA 4 [Pa · s] | eta* - Copo 4 [Pa · s] |
| --- | --- | --- | --- | --- | --- | --- |
| 628 | 206 | 363 | 312 | 404 | 182 | 361 |
| 292 | 258 | 508 | 415 | 575 | 237 | 518 |
| 135 | 302 | 659 | 516 | 767 | 288 | 705 |
| 62.8 | 334 | 802 | 606 | 967 | 337 | 943 |
| 29.2 | 353 | 923 | 676 | 1160 | 382 | 1190 |
| 13.5 | 363 | 1010 | 726 | 1340 | 418 | 1490 |
| 6.28 | 368 | 1080 | 761 | 1510 | 444 | 1820 |
| 2.92 | 372 | 1120 | 785 | 1660 | 461 | 2170 |
| 1.35 | 375 | 1150 | 805 | 1810 | 470 | 2520 |
| 0.628 | 379 | 1170 | 825 | 1980 | 476 | 2830 |
| 0.292 | 381 | 1170 | 849 | 2260 | 472 | 3080 |
| 0.135 | 396 | 1190 | 930 | 2910 | 477 | 3380 |
| 0.0628 | 442 | 1210 | 1190 | 4200 | 498 | 3750 |

It is observed that the Copo materials according to the invention have a greater melt viscosity than the comparative PEBAs.

The Copo materials according to the invention are thus more readily extrudable than the comparative PEBA materials.

Example 2: Measurement of the Drawability of the PEBAs and Copos by Means of a Rheotens Description of the Elongational Rheology Test:

Principle: A rod is extruded through a die of a capillary rheometer; it is gripped, in molten form, by two pairs of wheels driven by a variable-speed motor. A first pair of wheels and the motor are mounted at the free, deflectable end of a support directly connected to a sensor, representing the restoring force.

The second pair of wheels (coupled to the first pair) makes it possible to guide and to limit the winding of the rod around the upper wheels. Small pads soaked with surfactant liquid (mixture of water, ethanol and surfactant) are also applied to the wheels in order to cool them and thus to limit the sticking effect.

Figure 2:
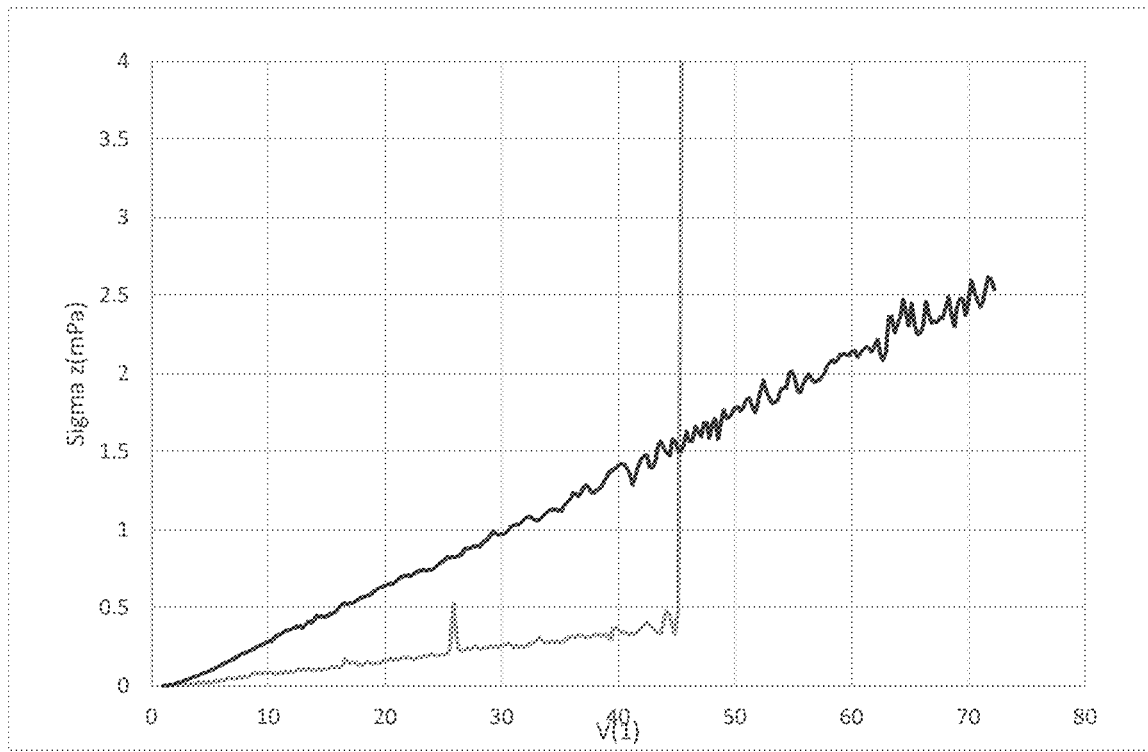
FIG. 2 shows a curve representing elongation stress on the y-axis as a function of the elongation factor on the x-axis.

The melt strength curves of FIGS. 1 and 2 represent the elongation stress on the y-axis as a function of the elongation factor on the x-axis.

Elongation Stress:

$$\sigma_2 = \frac{F \cdot v}{A_0 \cdot v_0}$$

Elongation Factor:

$$V = \frac{v}{v_0}$$

with v: speed at which the rod is drawn: wheel speed
F: Force applied by the rod
$A_0$: Area of the rod when it leaves the die
$v_0$: Extrusion speed of the rod leaving the die Operating Conditions:

Capillary Rheometer:
Device: Gottfert Rheotester 2000 capillary rheometer.
Die: 30 mm×1 mm dies L/d=30/1
Sensor: 0-1400 bar (reference 131055)
Preheating time: 300 s (5 min)
Test temperatures: 150° C. or 180° C. depending on the grades
Shear rate: 50 $s^{-1}$
Rheotens:
Wheels: Notched stainless steel
Draw height: 105 mm
Gap: about 0.6 mm
Vo (initial speed) 6 mm/s
Accelerations: a*t, a=2.4 $mm/s^2$
Lubrication: mixture of water+surfactant
Piston diameter: 12 mm
Piston speed: 0.043 mm/s FIG. 1 represents the result of the elongational rheology measurement on PEBA 3 (bottom curve) and on Copo 3 (top curve) at 180° C.

FIG. 2 represents the result of the elongational rheology measurement on PEBA 4 (bottom curve) and on Copo 4 (top curve) at 150° C. The copolymers Copo 3 and Copo 4 according to the invention have improved drawability relative to that of the respective controls PEBA 3 and PEBA 4. The block copolymers including at least one carboxylic acid chain end blocked with a polycarbodiimide have improved stretchability relative to that of the films based on the same respective non-blocked copolymers.

Example 3—Comparison of the Residual Tensile Strain of PEBA 1 and of Copo 1

Figure 3:
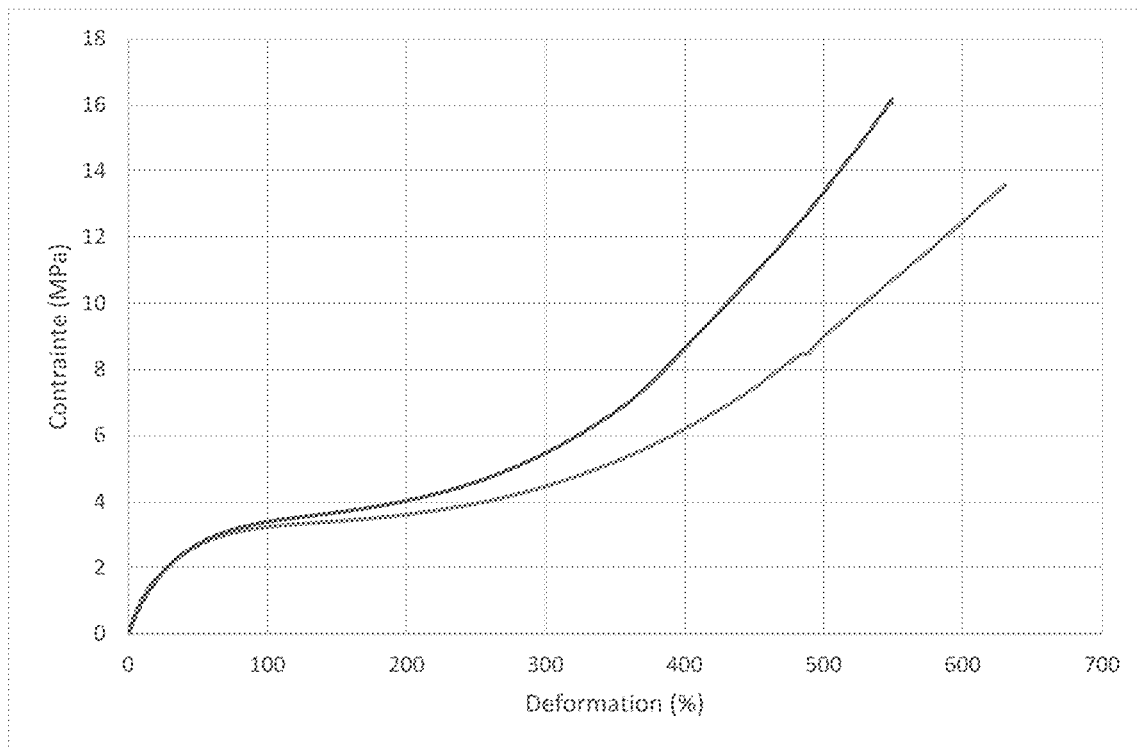
FIG. 3 shows a tensile curve with results according to the standard ISO 527-1A:2012 at 23° C. for PEBA 1 (bottom curve) and Copo 1 (top curve).

FIG. 3 shows the tensile curve results according to the standard ISO 527-1A:2012 at 23° C. for PEBA 1 (bottom curve) and Copo 1 (top curve).

For the same tensile strain (on the y-axis), the percentage of residual strain (x-axis) is lower in the case of Copo 1 according to the invention (top curve) than for PEBA 1 (bottom curve), which indicates better durability of the material made from Copo1.

Example 4—Comparison of the Abrasion Resistance and Adhesion Resistance of the Various PEBAs and Copos The results of these tests are given in table 1 below.

TABLE 2

| Standards | Tests | Units | PEBA 1 | Copo 1 | PEBA 2 | Copo 2 | PEBA 3 | Copo 3 | PEBA 4 | Copo 4 |
| --- | --- | --- | --- | --- | --- | --- | --- | --- | --- | --- |
| ISO 9352:2012 | Abrasion resistance | | n = 4 | n = 4 | n = 4 | n = 4 | n = 4 | n = 4 | n = 4 | n = 4 |
| | Loss of mass | mg | 36.7 | 26.3 | 41.9 | 33.9 | 17.0 | 13.1 | 55.4 | 41.9 |
| | and | | 7.3 | 6.0 | 4.4 | 3.3 | 3.9 | 2.4 | 2.8 | 2.9 |

TABLE 2-continued

| Standards | Tests | Units | PEBA 1 | Copo 1 | PEBA 2 | Copo 2 | PEBA 3 | Copo 3 | PEBA 4 | Copo 4 |
|---|---|---|---|---|---|---|---|---|---|---|
| ISO 34-1:2015 | Tear strength | | n = 5 | n = 5 | | | | | | |
| | Median SI | kN/m | 41 | 48 | | | | | | |
| | min | | 37 | 45 | | | | | | |
| | max | | 45 | 49 | | | | | | |
| | Median SO | kN/m | 29 | 33 | | | | | | |
| | min | | 27 | 31 | | | | | | |
| | max | | 35 | 35 | | | | | | |

The loss of mass is smaller in the case of the copolymers according to the invention, thus the copolymers according to the invention have better abrasion resistance than the respective control PEBAs.

Similarly, the copolymers according to the invention have a better tear strength than the respective control PEBAs.

Example 5—Measurement of the Dispersity of the Various PEBAs and Copos

The weight-average and number-average molecular masses Mw and Mn measured increase, respectively, on passing from a PEBA to the corresponding Copo according to the invention, which indicates that the reaction took place between the carbodiimide function of the polycarbodiimide and the acid function of the PEBA to form the block copolymer bearing a blocked acid chain end according to the invention.

The dispersity Mw/Mn is moreover conserved in each Copo according to the invention relative to the corresponding initial PEBA, and the measured value is less than 3, in all the copolymers, which proves that the copolymers according to the invention remained in noncrosslinked linear form. They are thus perfectly recyclable.

The dispersity is determined as being equal to the ratio between the weight-average molecular mass and the number-average molecular mass Mw/Mn. The measurement accuracy is given to within 5%.

The number-average molecular (or molar) mass is set by the content of chain limiter. It may be calculated according to the equation:

$$Mn = (n_{monomer}/n_{limiter}) * M_{repeating\ unit} + M_{limiter}$$

$n_{monomer}$ = number of moles of monomer $n_{limiter}$ = number of moles of diacid in excess $M_{repeating\ unit}$ = molar mass of repeating unit $M_{limiter}$ = molar mass of diacid in excess In summary, the polycarbodiimide thus used according to the present invention makes it possible to improve the extrudability, stretchability, copolymer durability, abrasion resistance and tear strength properties, while at the same time conserving its dispersity and thus its recyclability.

These advantageous properties were not able to be observed with monomeric carbodiimides, since their volatility did not enable them to react or to effectively block said carboxylic acid of the block copolymer of the invention.

The invention claimed is:

1. A block copolymer comprising at least one rigid polyamide PA block and at least one flexible block,
    wherein the flexible block comprises at least one block resulting from polyetherdiols,
    wherein said block copolymer includes at least one carboxylic acid chain end blocked with a polycarbodiimide, and
    wherein said copolymer is in noncrosslinked linear form, its dispersity Mw/Mn being less than 3,
    wherein the weight content of the polycarbodiimide represents from 0.5% to 10% by weight, relative to the total weight of the copolymer.

2. The copolymer as claimed in claim 1, wherein the weight-average molecular mass of the polycarbodiimide is greater than 10,000 g/mol.

3. The copolymer as claimed in claim 1, wherein said carboxylic acid forms a urea bond by reaction with the carbodiimide of the polycarbodiimide.

4. The copolymer as claimed in claim 1, wherein said flexible block comprises an additional block, the additional block being at least one block selected from the group consisting of polyether, polyester, polydimethylsiloxane, polyolefin, polycarbonate, and copolymers thereof.

5. The copolymer as claimed in claim 1, wherein said block resulting from polyetherdiols comprises at least one polyether (PE), selected from the group consisting of poly(tetramethylene glycol) (PTMG), poly(1,2-propylene glycol) (PPG), poly(1,3,propylene glycol) (P03G), poly(ethylene glycol) (PEG) and copolymers thereof.

6. The copolymer as claimed in claim 1, wherein said flexible block comprises an additional block comprising at least one polyester (PES) selected from the group consisting of polyester diols, poly(caprolactone) and polyesters based on fatty acid dimers.

7. The copolymer as claimed in claim 1, wherein said polyamide PA block comprises at least one of the following polyamide units: 11, 12, 6, 610, 612, 1010, 1012, and copolyamides thereof.

8. The copolymer as claimed in claim 1, wherein the weight ratio of the PA blocks to the flexible blocks is within the range from 0.3 to 10.

9. A process for manufacturing the copolymer as claimed in claim 1, comprising a step of mixing of the block copolymer and of the polycarbodiimide so that at least one carboxylic acid chain end of the block copolymer reacts with a carbodiimide function of the polycarbodiimide.

10. The process as claimed in claim 9, wherein the mixing is performed using a single-screw or twin-screw extruder or by adding the polycarbodiimide during the synthesis of the block copolymer.

* * * * *